United States Patent
Dalal et al.

(10) Patent No.: US 7,373,323 B1
(45) Date of Patent: May 13, 2008

(54) METHOD AND SYSTEM FOR MULTI-ENTERPRISE OPTIMIZATION USING FLEXIBLE TRADE CONTRACTS

(75) Inventors: Mukesh Dalal, Flower Mound, TX (US); Leenam Dalal, Flower Mound, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/548,466

(22) Filed: Apr. 13, 2000

(51) Int. Cl.
*G06O 40/00* (2006.01)

(52) U.S. Cl. ..................... 705/36 R; 705/35
(58) Field of Classification Search ................. 705/10, 705/36, 37, 36 R, 35
See application file for complete search history.

(56) References Cited

U.S. PATENT DOCUMENTS

| | | | |
|---|---|---|---|
| 4,827,423 A | 5/1989 | Beasley et al. | 364/468 |
| 5,040,123 A | 8/1991 | Barber et al. | 364/468 |
| 5,615,109 A | 3/1997 | Eder | 395/208 |
| 5,754,938 A * | 5/1998 | Herz et al. | 455/3.1 |
| 5,758,097 A * | 5/1998 | Debe et al. | 395/235 |
| 5,897,620 A | 4/1999 | Walker et al. | 705/5 |
| 5,953,707 A | 9/1999 | Huang et al. | 705/10 |
| 5,970,479 A * | 10/1999 | Shepherd | 705/37 |
| 5,974,395 A | 10/1999 | Bellini et al. | 705/9 |
| 5,991,732 A | 11/1999 | Moslares | 705/8 |
| 6,112,189 A * | 8/2000 | Rickard et al. | 705/37 |
| 6,134,536 A * | 10/2000 | Shepherd | 705/37 |
| 6,141,653 A * | 10/2000 | Conklin et al. | 705/80 |
| 6,151,582 A | 11/2000 | Huang et al. | 705/8 |
| 6,249,774 B1 | 6/2001 | Roden et al. | 705/28 |
| 6,263,321 B1 * | 7/2001 | Daughtery, III | 705/36 |

FOREIGN PATENT DOCUMENTS

| | | |
|---|---|---|
| EP | 0 770 967 A2 | 5/1997 |
| EP | 0 770967 * | 5/1997 |
| GB | 2 293 902 A | 4/1996 |
| GB | 2 302 427 A | 1/1997 |
| WO | WO 98/08177 | 2/1998 |
| WO | W0 98/34167 | 8/1998 |
| WO | WO9906933 * | 2/1999 |

OTHER PUBLICATIONS

Farnsworth E. A. et al., Cases and Materials on contracts, 4th ed., Westbury, N.Y., 1988, pp. 181188 and 216.*
Federal Register, vol. 62, No. 21, Jan. 31, 1997, p. 4821, col. 3, lines 17-57.*

(Continued)

*Primary Examiner*—James Kramer
*Assistant Examiner*—Kirsten Apple
(74) *Attorney, Agent, or Firm*—Booth Udall, PLC

(57) ABSTRACT

A method of multi-enterprise optimization at a buyer computer (20) includes accessing a forecasted demand for at least one item and generating one or more proposed flexible trade contracts (500, 530, 560) using the forecasted demand for the item. The proposed flexible trade contract (500, 530, 560) is communicated to a seller computer (40) and subsequently executed after acceptance of the proposed flexible trade contract (500, 530, 560) at the seller computer (40) to create a flexible trade contract (500, 530, 560). Each proposed flexible trade contract (500, 530, 560) may be a forward contract (500), an option contract (530), or a flexible forward contract (560).

30 Claims, 10 Drawing Sheets

OTHER PUBLICATIONS wysiwyg://31/http:quotes.nasdaq.com/op...s/option_flex_index_options_contract.*

"Rightworks and 12 Technologies Add Procurement to Rhythm Solutions Delivering Total Supply Chain Optimization and Execution", PR Newswire. New York: Oct. 11, 1999. p. 1.*

"Rightworks 4 Extends Procurement Solutions to New Market", PR Newswire. New York: Aug. 10, 1999. p. 1.*

"MOAI Technologies Introduces New Category of Business-to-Business Auction Software That Enables Virtual Private Marketplaces", Business Wire. New York: Mar. 16, 1998. p. 1.*

"Clarus Extends Network Services With Negotiated E-Commerce Solutions From MOAI", business Wire. New York: Apr. 14, 2000. p. 1.*

"Concur and MOAI Parter to Deliver Business-to-Business Negotiated Electronic Commerce Services", PR Newswire. New York: Apr. 4, 2000. p. 1.*

"Advanced Manufacturing Online-AMO- Announces New Trading Platform", Business Wire. New York: De 14, 1999. p. 1. teaches.*

Dr. Pattie Maes etc. , "Agents That Buy and Sell", Communications of the ACM, Mar. 1999, vol. 42, No. 3.*

Dr. Pattie Maes, Smart Commerce : The Future of Intelligent Agents in CyberspaceJournal of Interactive Marketing. Summer 1999. vol. 13, Iss. 3; p. 66 (11 pages).*

Anonymous: "A Supply Chain Management Algorithm with Vendor Information via Internet", Research Disclosure, v. 41, No. 416, p. 1, Dec. 1998.

Peter H. Ritchken et al., "Contingent Claims Contracting for Purchasing Decisions in Inventory Management," Operations Research, v. 34, n. 6, pp. 864-870, Nov. 1986.

U.S. Appl. No. 09/398,170, "System and Method for Multi-Enterprise Supply Chain Optizimation," filed by Ranjit H. Notani, Sep. 17, 1999.

George W. Aljian, Purchasing Handbook, McGraw-Hill Company, Second Edition, pp. 13-5 and 13-33, 1966.

John Downes and Jordan Elliot Goodman, Dictionary of Finance and Investment Terms, 4th Edition, Barron's Publisher 1995 (pp. 173, 390-393), 1995.

* cited by examiner

500

| | | |
|---|---|---|
| 502 | TYPE: | STANDARDIZED FORWARD CONTRACT |
| 504 | BUYING ENTERPRISE: | B |
| 506 | SELLING ENTERPRISE: | Y |
| 508 | EXECUTION DATE: | SEPTEMBER 5, 1999 |
| 510 | DELIVERY DATE: | APRIL 1, 2000 |
| 512 | PRODUCT: | WIDGET XYZ OF ENTERPRISE Y |
| 514 | DELIVERY LOCATION: | DALLAS DISTRIBUTION CENTER OF ENTERPRISE B |
| 516 | QUANTITY: | 1800 UNITS |
| 518 | PENALTY FOR VIOLATION: | $10/UNIT |
| 520 | PRICE: | $100/UNIT |

| | | |
|---|---|---|
| 532 | TYPE: | STANDARDIZED OPTION CONTRACT |
| 534 | BUYING ENTERPRISE: | B |
| 536 | SELLING ENTERPRISE: | Y |
| 538 | EXECUTION DATE: | SEPTEMBER 5, 1999 |
| 550 | EXERCISE PERIOD BEGIN: | JANUARY 1, 2000 } 548 |
| 552 | EXERCISE PERIOD END: | MARCH 1, 2000 |
| 540 | DELIVERY DATE: | APRIL 1, 2000 |
| 542 | PRODUCT: | WIDGET XYZ OF ENTERPRISE Y |
| 544 | DELIVERY LOCATION: | DALLAS DISTRIBUTION CENTER OF ENTERPRISE B |
| 546 | MAXIMUM QUANTITY: | 10000 UNITS |
| 554 | PENALTY FOR VIOLATION: | $10/UNIT |
| 556 | PRICE: | $100/UNIT |
| 558 | OPTION PRICE: | $5000 |

562 — TYPE: STANDARDIZED FLEXIBLE FORWARD CONTRACT
564 — EXECUTION DATE: SEPTEMBER 5, 1999
568 — EXERCISE PERIOD BEGIN: JANUARY 1, 2000 ⎫ 566
570 — EXERCISE PERIOD END: MARCH 1, 2000 ⎭
572 — TOTAL QUANTITY: 10000 UNITS
574 — OPTION PRICE: $5000

SUBCONTRACT #1
578a — BUYING ENTERPRISE: B
580a — SELLING ENTERPRISE: Y                                  ← 576a
582a — DELIVERY DATE: APRIL 1, 2000
584a — PRODUCT: WIDGET ABC OF ENTERPRISE Y
586a — DELIVERY LOCATION: DALLAS DISTRIBUTION CENTER OF ENTERPRISE B
594a — MAXIMUM QUANTITY: 8000 UNITS ⎫ 588a
596a — MINIMUM QUANTITY: 5000 UNITS ⎭
590a — PENALTY FOR VIOLATION: $10/UNIT
592a — PRICE: $100/UNIT

SUBCONTRACT #2
578b — BUYING ENTERPRISE: B
580b — SELLING ENTERPRISE: Y                                  ← 576b
582b — DELIVERY DATE: MAY 1, 2000
584b — PRODUCT: WIDGET XYZ OF ENTERPRISE Y
586b — DELIVERY LOCATION: HOUSTON DISTRIBUTION CENTER OF ENTERPRISE B
594b — MAXIMUM QUANTITY: 5000 UNITS ⎫ 588b
596b — MINIMUM QUANTITY: 2000 UNITS ⎭
590b — PENALTY FOR VIOLATION: $8/UNIT
592b — PRICE: $80/UNIT

*FIG. 4c*

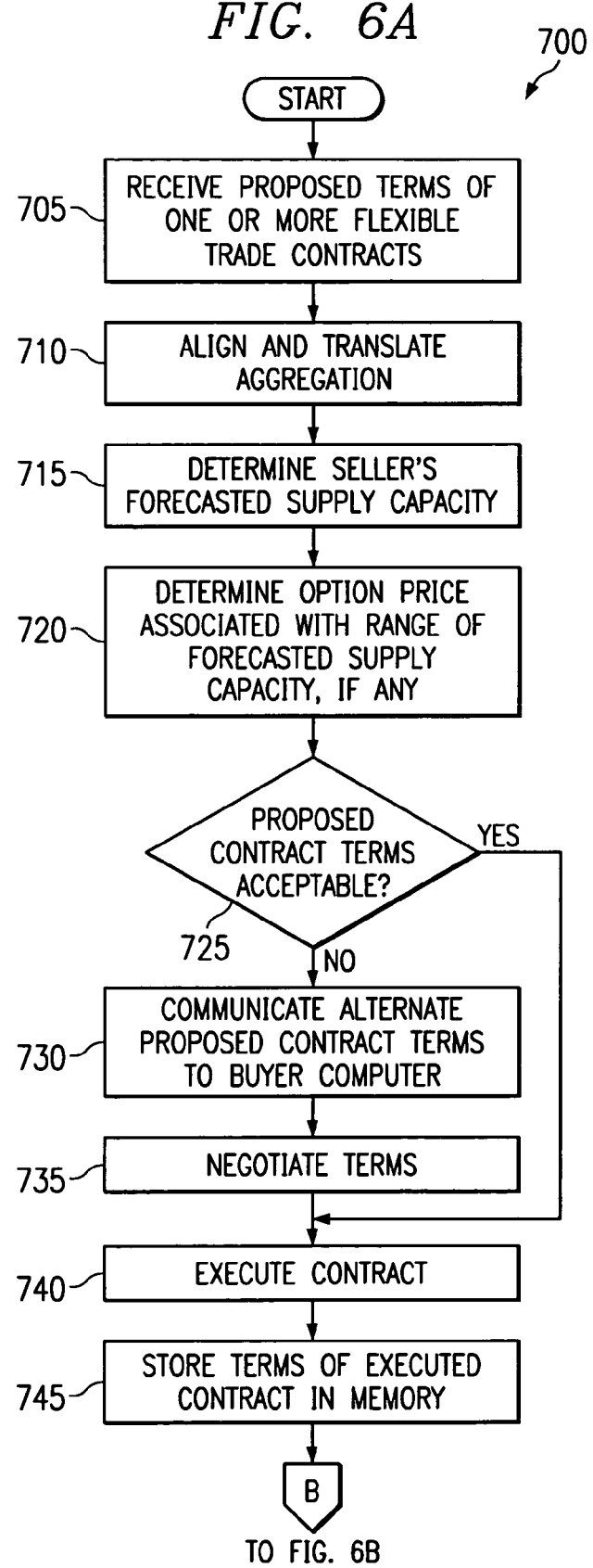

METHOD AND SYSTEM FOR MULTI-ENTERPRISE OPTIMIZATION USING FLEXIBLE TRADE CONTRACTS

CROSS-REFERENCE TO RELATED APPLICATIONS

This application is related to U.S. application Ser. No. 09/398,170 filed on Sep. 17, 1999 for a "System and Method for Multi-Enterprise Supply Chain Optimization."

TECHNICAL FIELD OF THE INVENTION

This invention relates generally to data processing, and more particularly to a method and system for multi-enterprise optimization using flexible trade contracts.

BACKGROUND OF THE INVENTION

Various approaches have been developed to help optimize one or more supply chain activities within an enterprise. These approaches have typically addressed only the needs of a single enterprise, rarely focusing on optimizing supply chain activities involving multiple enterprises.

Such approaches usually assume that the enterprise only considers its own needs and interests, imposing optimization rules on itself by taking into account these needs and interests. When multiple enterprises become involved in a supply chain activity, optimization rules usually must be negotiated. Previous approaches typically do not account for this, which leads to several problems. Supply-demand mismatches are more common because these approaches fail to consider the needs and interests of all the enterprises involved in the activity. Such approaches also typically result in agreements that are complex and difficult to interpret, which makes the contracts less reliable. Further, the complexity of the agreements may lead to distrust between the enterprises and misuse of the contracts. These and other deficiencies have made previous approaches increasingly inadequate for the needs of many enterprises.

SUMMARY OF THE INVENTION

The present invention provides a method and system for multi-enterprise optimization using flexible trade contracts that reduces or eliminates shortcomings of prior approaches.

In accordance with one embodiment of the present invention, a method of multi-enterprise optimization at a buyer computer includes accessing a forecasted demand for at least one item and generating one or more proposed flexible trade contracts using the forecasted demand for the item. The method also includes communicating each proposed flexible trade contract to a seller computer and executing a flexible trade contract created after acceptance of the proposed flexible trade contract at the seller computer. In a more particular embodiment, each proposed flexible trade contract is either a forward contract, an option contract, or a flexible forward contract.

In accordance with another embodiment of the present invention, a method of multi-enterprise optimization at a seller computer includes receiving one or more proposed flexible trade contracts from a buyer computer. Each proposed flexible trade contract reflects a buyer's forecasted demand for at least one item. The method also includes accepting the proposed flexible trade contract to create a flexible trade contract and executing the flexible trade contract. In a more particular embodiment, each proposed flexible trade contract is either a forward contract, an option contract, or a flexible forward contract.

The method and system of the present invention provide a number of important technical advantages. The present invention provides the ability to create concise flexible trade contracts for trading goods and services among enterprises. The flexible trade contracts generated according to the present invention may also be less complex than agreements created using conventional approaches. As a result, these flexible trade contracts help reduce mistrust between the enterprises, help increase the reliability of those contracts, and encourage information sharing by removing such traditional dangers. Another technical advantage of the present invention is the reduction of supply-demand mismatch problems such as excess inventory, inventory shortfalls, process disruptions, and unplanned trades. The flexible trade contracts provide forward visibility and commitment to the needs and capabilities of trading partners. These enterprises may use this improved visibility to optimize supply chain activities between the enterprises. A further advantage is the ability to readily and flexibly create a wide variety of complex contracts, using flexible trade contracts as building blocks to tailor the contracts to the particular situation. Other technical advantages are readily apparent to those skilled in the art from the attached Figures, description, and claims.

BRIEF DESCRIPTION OF THE DRAWINGS

For a more complete understanding of the present invention and the advantages thereof, reference is now made to the following description taken in connection with the accompanying drawings, in which:

FIGS. 4a through 4c illustrate exemplary terms of flexible trade contracts executed between a buyer computer and a seller computer;

DETAILED DESCRIPTION OF THE INVENTION

Figure 1:
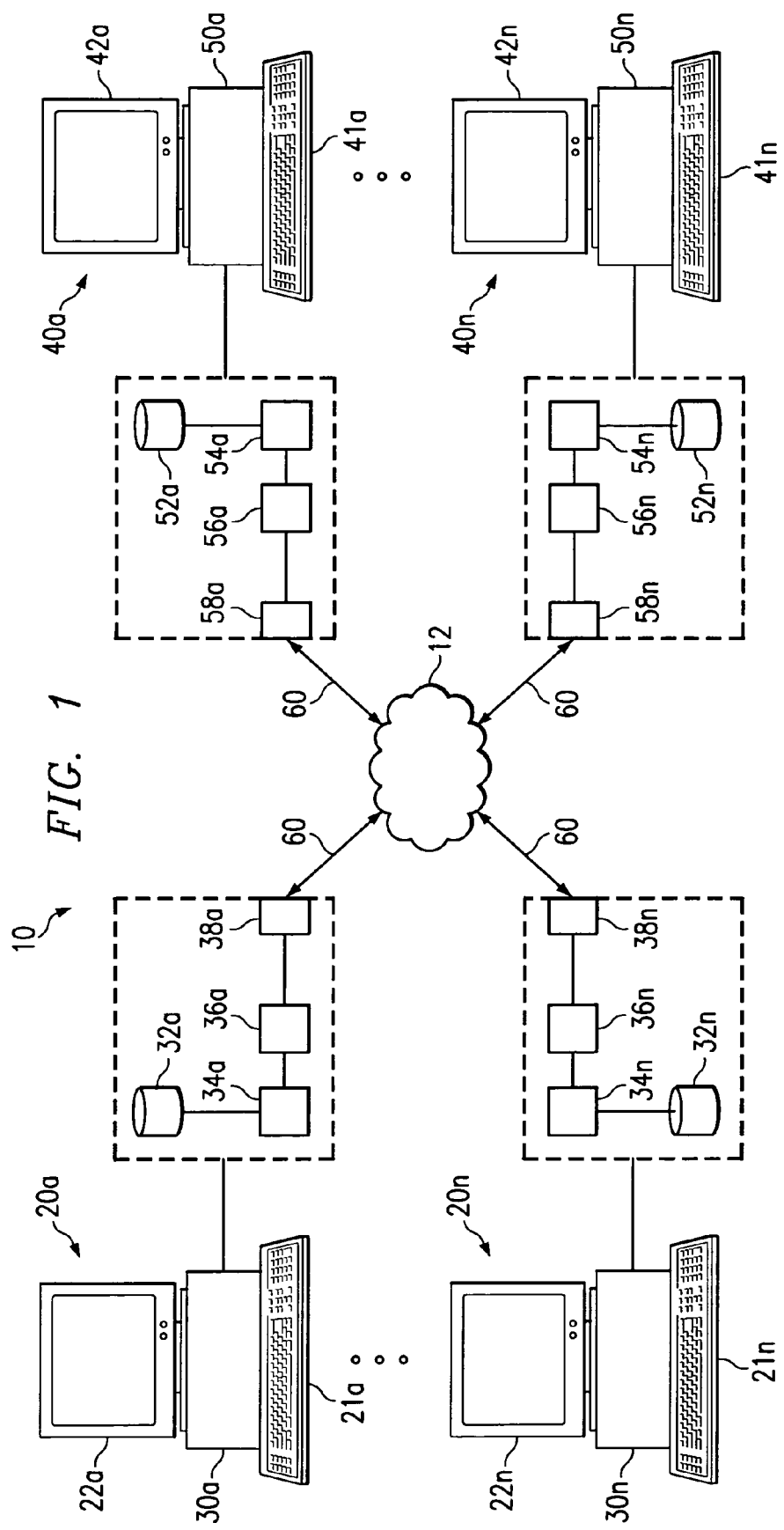
FIG. 1 illustrates an exemplary system for multi-enterprise optimization using flexible trade contracts.

FIG. 1 illustrates an exemplary system 10 for multi-enterprise optimization using flexible trade contracts. In the illustrated embodiment, system 10 includes one or more buyer computers 20a through 20n and one or more seller computers 40a through 40n. In one aspect of operation, one or more buyer computers 20 communicate with one or more seller computers 40 to collaborate in negotiating the supply by sellers and procurement by buyers of products, services, or other tangible or intangible items offered by sellers associated with seller computers 40. Buyer computers 20 and seller computers 40 cooperate to attempt to optimize one or more supply chain or other suitable activities between buyers associated with buyer computers 20 and sellers associated with seller computers 40. Ideally, through an interactive negotiation process and contractual monitoring system, system 10 helps to eliminate mismatches between a buyer's demand and a seller's supply to increase the profitability of each enterprise, among other benefits.

Each buyer and seller using system 10 may have access to one or more buyer computers 20 and seller computers 40, respectively, at one or more locations. Buyer computers 20 and seller computers 40 may be desktop computers, laptop computers, personal digital assistants, or any other computing or communications devices. Computers 20 and 40 may include input devices 21 and 41; output devices 22 and 42; and processors 30 and 50, and associated memories, operable to manipulate information and execute instructions according to the operation of system 10. Input devices 21 and 41 may include, for example, a keyboard, mouse, touch screen, microphone, or other suitable device to receive information associated with system 10. Output devices 22 and 42 may include, for example, a video display, a printer, a speaker, or other suitable device to convey information associated with system 10.

Items within the dashed lines in FIG. 1 represent exemplary functional operation and data organization of the associated components of system 10. For example, computers 20 and 40 include or otherwise have access to memories 32 and 52, respectively. Memories 32 and 52 may be local to computers 20 and 40, or all or a portion could alternatively reside at one or more remote locations accessible to computers 20 and 40. Buyer computer 20 may include a procurement manager 34 to assist buyer computer 20 in negotiating and executing flexible trade contracts or other suitable supply chain related contracts with appropriate seller computers 40. Seller computer 40 may include a supply manager 54 to assist seller computer 40 in negotiating and executing flexible trade contracts or other suitable supply chain related contracts with appropriate buyer computers 20.

Buyer computers 20 and seller computers 40 communicate over a network 12 using communication links 60. In the illustrated embodiment, communication links 60 include communication media suitable to provide a connection between buyer computers 20 or seller computers 40 and network 12. In a particular embodiment, network 12 includes a global computer network, such as the Internet. Network 12 may, however, include any suitable wireline or wireless system that supports communications between buyer computers 20 and seller computers 40. For example, network 12 may include one or more public switched telephone networks (PSTN), integrated services digital networks (ISDN), local area networks (LAN), metropolitan area networks (MAN), wide area networks (WAN), or other communication systems or combination of communication systems at one or more locations.

Network 12 may facilitate direct communication between buyer computers 20 and seller computers 40. Network 12 may also facilitate indirect communication between one or more buyer computers 20 and one or more seller computers 40 through an intermediary such as, for example, a business-to-business exchange or an on-line marketplace. In a particular embodiment, the intermediary acts on behalf of or as an agent for one or more buyers or one or more sellers.

Computers 20 and 40 may also include interfaces 38 and 58 to facilitate connection to communication links 60. These interfaces may include any appropriate hardware, software, firmware, or combination thereof to facilitate communication over network 12. Computers 20 and 40 may also include browsers 36 and 56 or other suitable components to facilitate access to and user interaction with other network elements. Browsers 36 and 56 may include stand-alone functional elements, or all or a portion of the functionality of browsers 36 and 56 could be integrated into other components of system 10, such as interfaces 38 and 58, respectively.

In operation, system 10 facilitates collaborative negotiations between one or more buyer computers 20 and one or more seller computers 40 to result in one or more flexible trade contracts for the supply of particular items to buyers utilizing system 10. Either buyer computer 20 or seller computer 40 may initiate a negotiation by transmitting proposed contract terms to the other. Buyer computer 20 and seller computer 40 may then negotiate the terms of the flexible trade contracts. In one embodiment, each flexible trade contract may include one or more forward contracts, one or more option contracts, and one or more flexible forward contracts, singly or in any suitable combination.

Each forward contract identifies an item that the seller agrees to supply and the buyer agrees to purchase, a quantity of the item, and a price for the item. The forward contract may also include a date and a location where the item is to be provided, and penalty provisions for deviation from the contract terms. In a particular embodiment, each forward contract includes a unit forward contract. A unit forward contract specifies that the buyer agrees to purchase and the seller agrees to supply one unit of an item.

Each option contract includes an option, which specifies obligations of the seller with respect to the supply of an item. The option may specify a maximum obligation of the seller in supplying the item, but the option could relate to any level of obligation between the parties. The option could, for example, specify a maximum quantity of the item that the seller agrees to supply, a maximum number of item types that the seller agrees to supply, and/or a maximum number of locations where the seller agrees to provide the item. The option contract may further include an option price representing a payment from the buyer to the seller for the value of the option to the buyer and the cost of the option to the seller. In addition, the option contract may include penalty provisions for deviation from the terms of the contract. In a particular embodiment, each option contract includes a unit option contract. A unit option contract specifies that the seller is obligated to supply a maximum of one unit of the item, to supply a maximum of one item type, and/or to provide the item to at most one location.

Each flexible forward contract specifies a total quantity of at least one item that a buyer is obligated to purchase and a seller is obligated to supply. The flexible forward contract also includes a plurality of subcontracts, each subcontract including an option. Each option may specify a minimum obligation of the buyer and a maximum obligation of the seller, although the options could relate to any level of obligation between the parties. For example, the options could relate to a range of quantities for each of at least two different items, a range of quantities for each of at least two different item types, or a range of quantities that will be provided to each of at least two locations. The flexible forward contract may further include an option price representing a payment of the buyer to the seller for the option. In addition, the flexible forward contract may include penalty provisions for deviation from the terms of the contract. In a particular embodiment, the flexible forward contract includes a unit flexible forward contract. A unit flexible forward contract specifies that the buyer is obligated to purchase and the seller is obligated to supply a total of one unit of an item. Each subcontract in the unit flexible forward contract also includes an option specifying a range of zero to one unit of an item, zero to one unit of an item type, and/or zero to one unit to be provided at a location.

In one embodiment, system 10 uses unit forward contracts, unit option contracts, and unit flexible forward contracts to generate more complex contracts. For example, one or more unit forward contracts can be used when a buyer wants to purchase at least some known quantity of an item or items. In addition to the unit forward contracts, the buyer may want to purchase additional quantities of an item, but the buyer is unsure what additional amount is needed. One or more unit option contracts give the buyer an opportunity to purchase an additional quantity of the item. Also, one or more unit forward flexible contracts may be used when the buyer needs some quantity of different items, but the buyer is unsure exactly which items are needed. Each unit forward flexible contract obligates the buyer to purchase one unit of an item, but the buyer may select at a later time which item to purchase.

The use of unit flexible trade contracts provides a significant advantage in on-line negotiations between buyer computer 20 and seller computer 40. For example, the use of unit flexible trade contracts allows for relatively easy pricing of the products involved in the contracts. Each type of unit flexible trade contract may be priced, and then multiple contracts of the same type may be generated by system 10. The final contractual price for the items is determined by summing the prices in the unit flexible trade contracts. Also, the use of flexible trade contracts provides flexibility in negotiations between computers 20 and 40. System 10 can deal with fixed demands for items using forward contracts and with ranges of potential demands using option or flexible forward contracts. Further, unit flexible trade contracts may be used to build any suitable type of complex contract.

In addition, each type of flexible trade contract may be used in optimizing a multi-enterprise supply chain activity in a different way. For example, forward contracts may reduce time-based safety stocks by transforming relatively expensive make-to-stock environments into efficient made-to-order environments. Option contracts may reduce quantity-based safety stocks by effectively transferring some inventory to the sellers. Flexible forward contracts may transform make-to-stock environments into configure-to-order environments by aggregating demand and supply variability. The use of different types of flexible trade contracts helps provide a balance of benefits between the enterprises in the supply chain.

Once the terms of the proposed contracts have been negotiated, the contracts are executed. In a particular embodiment, the terms of the executed contracts are stored at the buyer computer 20 and the seller computer 40. Storing the contract terms facilitates monitoring each party's progress in fulfilling its contractual obligations. In addition, system 10 can enforce the terms of the contracts by, for example, prohibiting buyer computer 20 from exercising an option in a manner inconsistent with the contract's terms, or by assessing penalties for violation of the contract's terms. Through the use of flexible trade contracts, system 10 increases supply chain efficiency by providing a comfortable level of certainty in the obligations of each party, while maintaining adequate flexibility to avoid supply/demand mismatches.

Figure 2A:
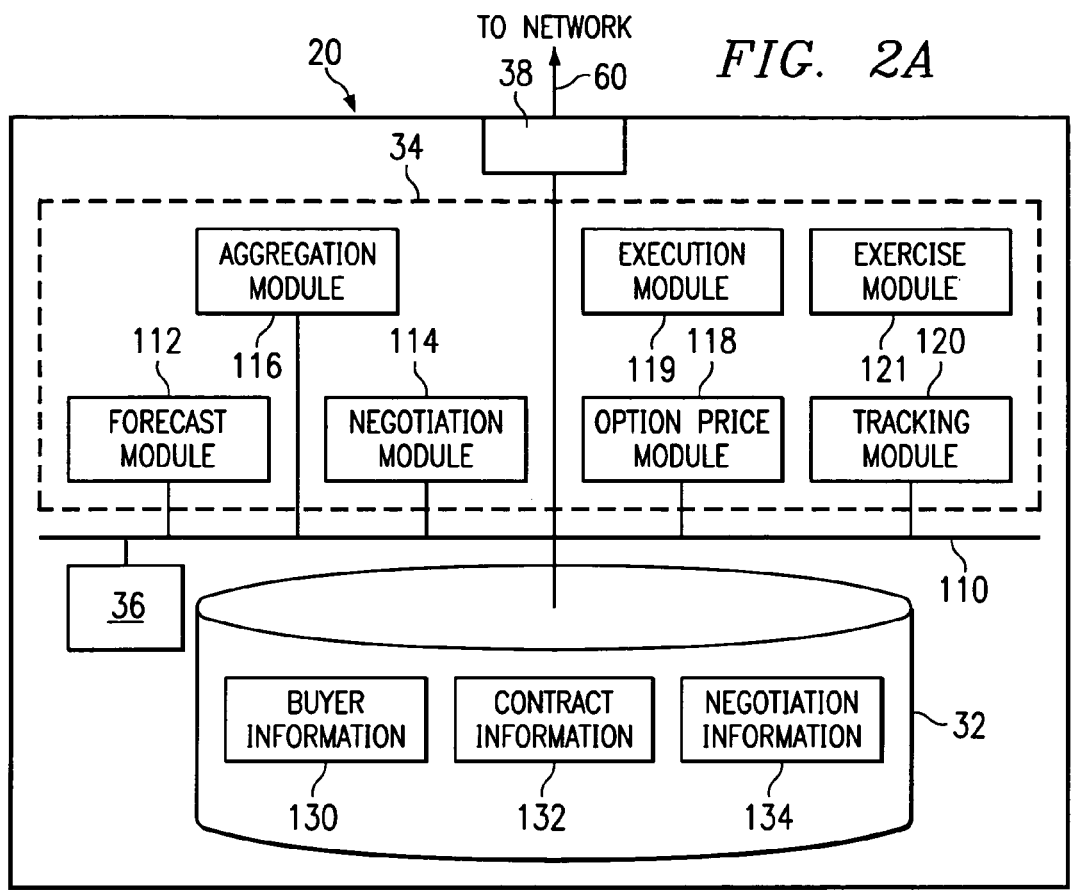
FIGS. 2a and 2b illustrate exemplary buyer and seller computers, respectively.
Figure 2B:
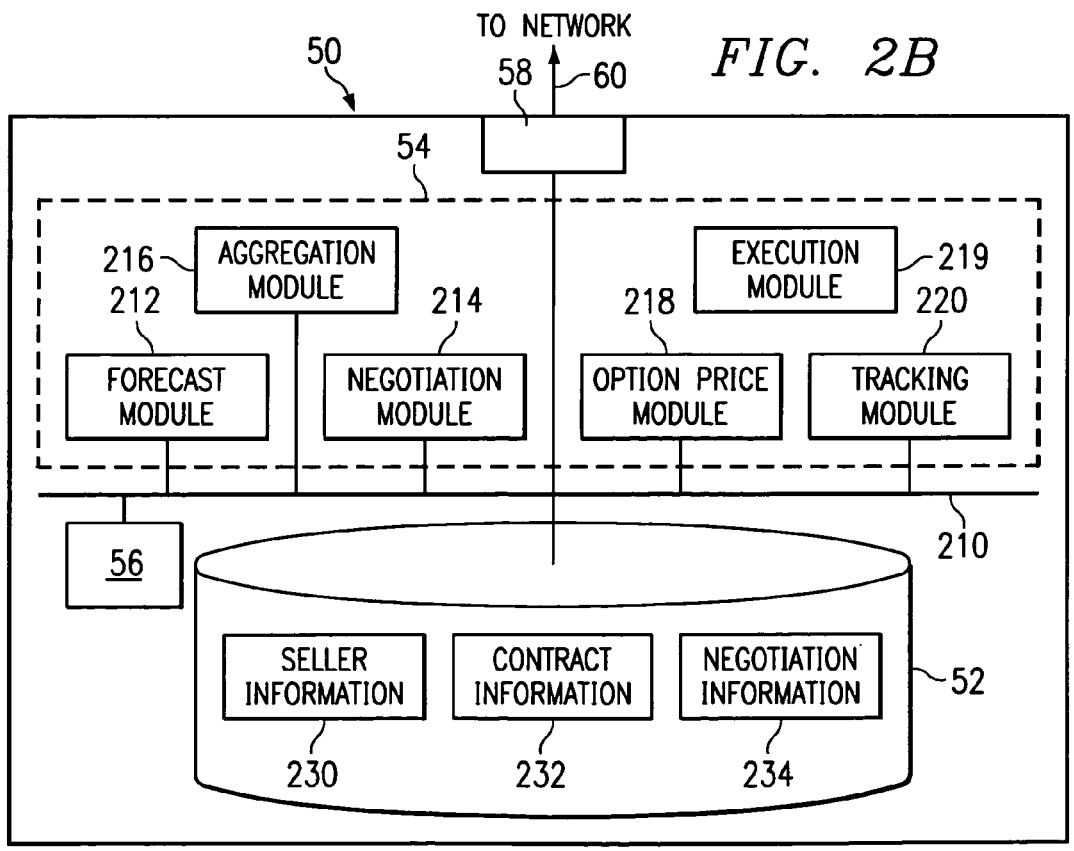

FIGS. 2a and 2b illustrate exemplary buyer computers 20 and seller computers 40, respectively. Components of buyer computer 20 communicate with one another over a communication link 110. Communication link 110 may include any suitable arrangement of hardware, software, and/or firmware to facilitate communication between elements within or peripherally coupled to buyer computer 20. As an example only, and not by way of limitation, communication link 110 may include a universal serial bus. Components of seller computer 40 communicate with one another over a communication link 210. Communication link 210 of seller computer 40 may be similar in structure and function to communication link 110 of buyer computer 20.

In the illustrated embodiment, procurement manager 34 and supply manager 54 each include a variety of modules or other appropriate components responsible for providing particular functionality and processing capabilities. The particular number and arrangement of modules shown in FIGS. 2a and 2b are for illustrative purposes only. Other arrangements, configurations, relationships, or processing divisions could be incorporated without departing from the scope of the present invention. Each module illustrated in FIGS. 2a and 2b may be separate from one another, or each module may be integrated with one or more other modules.

In this embodiment, procurement manager 34 may include a forecast module 112. Forecast module 112 operates to provide estimates of the buyer's future demand for one or more products, services, or other tangible or intangible items based, for example, on historical demand and projected market changes. Similarly, supply manager 54 of seller computer 40 includes a forecast module 212. Forecast module 212 may provide estimates of the seller's supply capacity for one or more products, services, or other tangible or intangible items, and may also estimate various customers' projected demand based, for example, on a past course of dealing with that customer. In another embodiment, buyer computer 20 may receive estimates of the buyer's future demand from a user of buyer computer 20, and/or seller computer 40 may receive estimates of the seller's supply capacity from a user of seller computer 40.

In the illustrated embodiment, buyer computer 20 and seller computer 40 can be configured to share information, such as the assumptions each is using in calculating its estimate. By sharing information and allowing each entity to critique the other's forecasts and underlying assumptions, system 10 provides an additional advantage of facilitating collaborative forecasting, which provides more accurate forecasts, increased efficiency, and fewer mismatches in supply and demand.

Procurement manager 34 and supply manager 54 may also include negotiation modules 114 and 214, respectively. Negotiation modules 114 and 214 operate to conduct negotiations between buyer computer 20 and seller computer 40 with respect to terms of the contract being negotiated. In a particular embodiment, negotiation modules 114 and 214 can be configured to conduct all or a part of the negotiations between buyer computer 20 and seller computer 40 without requiring user input.

To further facilitate negotiations between buyer computer 20 and seller computer 40, procurement manager 34 and supply manager 54 may include aggregation modules 116 and 216, respectively. Aggregation modules 116 and 216 cooperate to align and perform any desirable transformation of parameters being negotiated. For example, certain contract parameters may be expressed as an option, or range of possible values. Aggregation modules 116 and 216 help ensure consistency between the underlying parameters on which each machine bases its computations, so that both parties have a consistent understanding of the terms of the resulting contract.

Procurement manager 34 and supply manager 54 may also include option price modules 118 and 218, respectively. Option price module 118 of buyer computer 20 estimates the value to the buyer of having flexibility to specify the buyer's obligation as an option instead of a fixed obligation. Option price module 218 of seller computer 40 estimates the cost to the seller of having a higher potential supply obligation under the contract than the buyer's potential obligation to purchase. An option price ultimately contained in a flexible trade contract reflects a balance between the flexibility gained by the buyer and the cost to the seller of facilitating that flexibility, and may also reflect the relative bargaining strengths of the parties involved. For example, a dominant buyer may be in a position to demand an option without paying any option price, or by paying a lower option price.

Procurement manger 34 and supply manager 54 may further include execution modules 119 and 219, respectively. Execution modules 119 and 219 operate to execute flexible trade contracts created after acceptance of the proposed flexible trade contracts and to store the terms of the contracts in memories 32 and 52, respectively.

Procurement manager 34 and supply manager 54 may also include tracking modules 120 and 220, respectively. Tracking modules 120 and 220 allow buyer computer 20 and seller computer 40 to monitor and enforce the terms of any currently pending contract. Tracking modules 120 and 220 may also calculate penalties for violations of the terms of the contracts.

Procurement manager 34 may further include an exercise module 121. After buyer computer 20 and seller computer 40 execute one or more flexible trade contracts, exercise module 121 may receive an updated forecasted demand from a user of buyer computer 20 or from forecast module 112. Exercise module 121 may exercise an option in one of the flexible trade contracts according to the updated forecasted demand.

Memory 32 of buyer computer 20 may include a variety of files or other data storage arrangements. In the illustrated embodiment, memory 32 includes a buyer information file 130, which can store various information relating to the buyer's business, as well as its historical and projected supply needs. Forecast module 112 and/or aggregation module 116 may access buyer information file 130 to obtain information helpful in forecasting supply needs and performing any necessary aggregate transformation during negotiations with seller computer 40.

Memory 32 may also include a contract information file 132, which stores information relating to currently pending contracts. Tracking module 120 may access contract information file 132 to observe and/or modify information associated with currently pending contracts as the contracts progress. Exercise module 121 may access contract information file 132 after receiving an updated forecasted demand to exercise an option in a flexible trade contract.

Memory 32 may further include negotiation information file 134, which includes various information useful in negotiating the terms of a contract. For example, negotiation information file 134 may include historical price lists, previous discounts offered by the seller or competitors of the seller, acceptable delivery schedules, and information relating to previously negotiated contracts. Negotiation module 114 may access negotiation information file 134 in determining whether to accept suggested contractual terms, to make a counter-offer, or to flag a particular issue as a problem requiring user attention.

Memory 52 of seller computer 40 may contain similar information files. For example, memory 52 may include a seller information file 230 containing various information relating to the seller's business, as well as its historical and projected ability to meet demand needs. Forecast module 212 and/or aggregation module 216 may access seller information file 230 to obtain information helpful in forecasting the seller's inventory and ability to meet projected demand needs, as well as to perform any necessary aggregate transformation during negotiations with seller computer 40.

Memory 52 may also include a contract information file 232, which stores information relating to currently pending contracts. Tracking module 220 may access contract information file 232 to observe and/or modify information associated with currently pending contracts as the contracts progress.

Memory 52 may further include negotiation information file 234, which includes various information useful in negotiating the terms of a contract. For example, negotiation information file 234 may include price lists previously given to particular buyers, discounts available to particular buyers, acceptable delivery schedules, and information relating to previously negotiated contracts. Negotiation module 214 may access negotiation information file 234 in determining whether to accept suggested contractual terms, to make a counter-offer, or to flag a particular issue as a problem requiring user attention.

In operation, forecast module 112 of buyer computer 20 may initially approximate its supply needs by applying current and/or historical supply data to various supply forecasting and optimization models to yield approximate supply needs. These supply needs may be expressed in terms of, for example, one or more items, one or more item types, and/or one or more geographical regions.

Known information may suggest that it is appropriate to rely on the accuracy of one or more of the approximations. For example, it may be known that an enterprise in a particular geographical region may currently be out of stock of a particular product; it may further be known that the enterprise has a need for that product by a particular date. In that case, the particular product, geographic region of the enterprise, and delivery date can be specified with confidence. A forward contract may be the appropriate type of contract to use in this situation.

In other cases, for various reasons, such as uncertainty in market conditions, the approximations yielded by the forecasting and optimization models may be suspect or uncertain. Continuing with the previous example, while it may be known that a particular enterprise in a particular geographical location will require some level of a particular product by a specified date, the exact quantity required may not be ascertainable with any certainty. Forecast module 112 may account for this uncertainty by specifying the quantity parameter as a range of potential values, or as an option to purchase a maximum quantity of the product. In this case, a forward contract may be used to supply some quantity of the product, and an option contract may be used to account for the uncertainty in the approximation.

In still other cases, while it may be known that a particular enterprise in a particular geographical location will require some level of two products by a specified date, the exact quantity required for each product may not be ascertainable with any certainty. Forecast module 112 may account for this uncertainty by specifying the quantity parameter for each product as a range of potential values, or as an option to purchase a quantity between a minimum specified quantity and a maximum specified quantity. Two forward contracts may be used to supply some minimum quantity of both products, and a flexible forward contract may be used to account for the uncertainty in the approximations.

Buyer computer 20 may, through negotiation module 114, derive suggested contractual terms, such as the price of at least one item, an exercise date or range of exercise dates for any options identified by forecast module 112, and/or any other term desired to be included in the supply contracts. Negotiation module 114 may consult, for example, buyer information file 130 and/or negotiation information file 134 in deriving the suggested contractual terms.

Buyer computer 20 communicates the suggested contractual terms, including forecasted supply requirements, to seller computer 40 associated with the seller supplying the desired item or items. Buyer computer 20 may communicate the suggested terms directly to seller computer 40 or indirectly through an intermediary such as, for example, a business-to-business exchange or on-line marketplace. Similarly, seller computer 40 may receive the suggested terms directly or indirectly from buyer computer 20. Negotiation modules 114 and 214 of buyer computer 20 and seller computer 40, respectively, begin with the suggested contract terms and negotiate the terms of one or more flexible trade contracts for the supply of the desired items. Prior to or during the negotiation process, aggregation modules 116 and 216 may perform any necessary or desired aggregation alignment and/or transformation. Aggregation modules 116 and 216 may access buyer information file 112 and seller information file 212 to determine a common aggregation of parameters to be implemented in the contract.

Figure 3A:
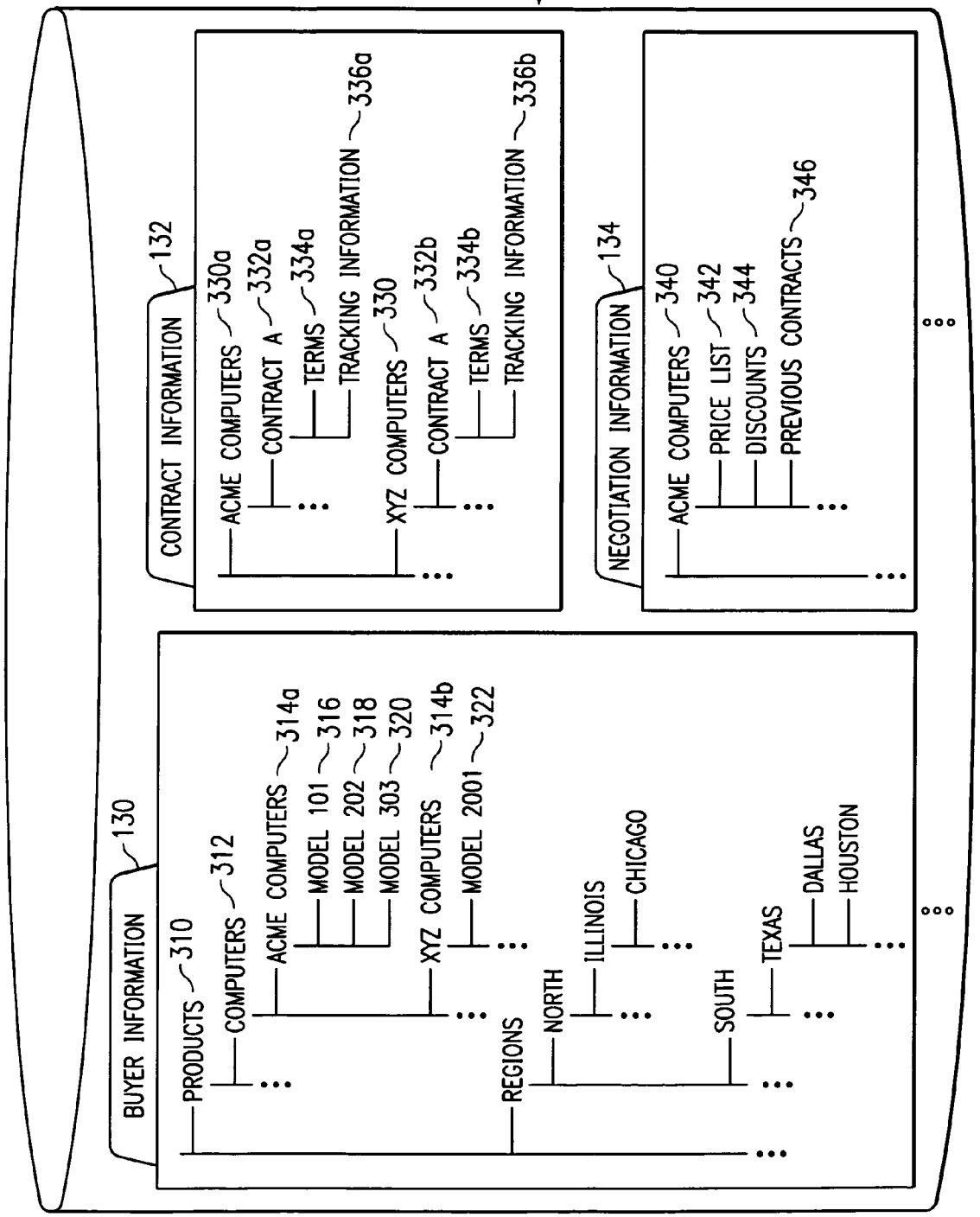
FIGS. 3a and 3b illustrate an exemplary portion of a memory accessible to a buyer computer and an exemplary portion of a memory accessible to a seller computer, respectively.
Figure 3B:
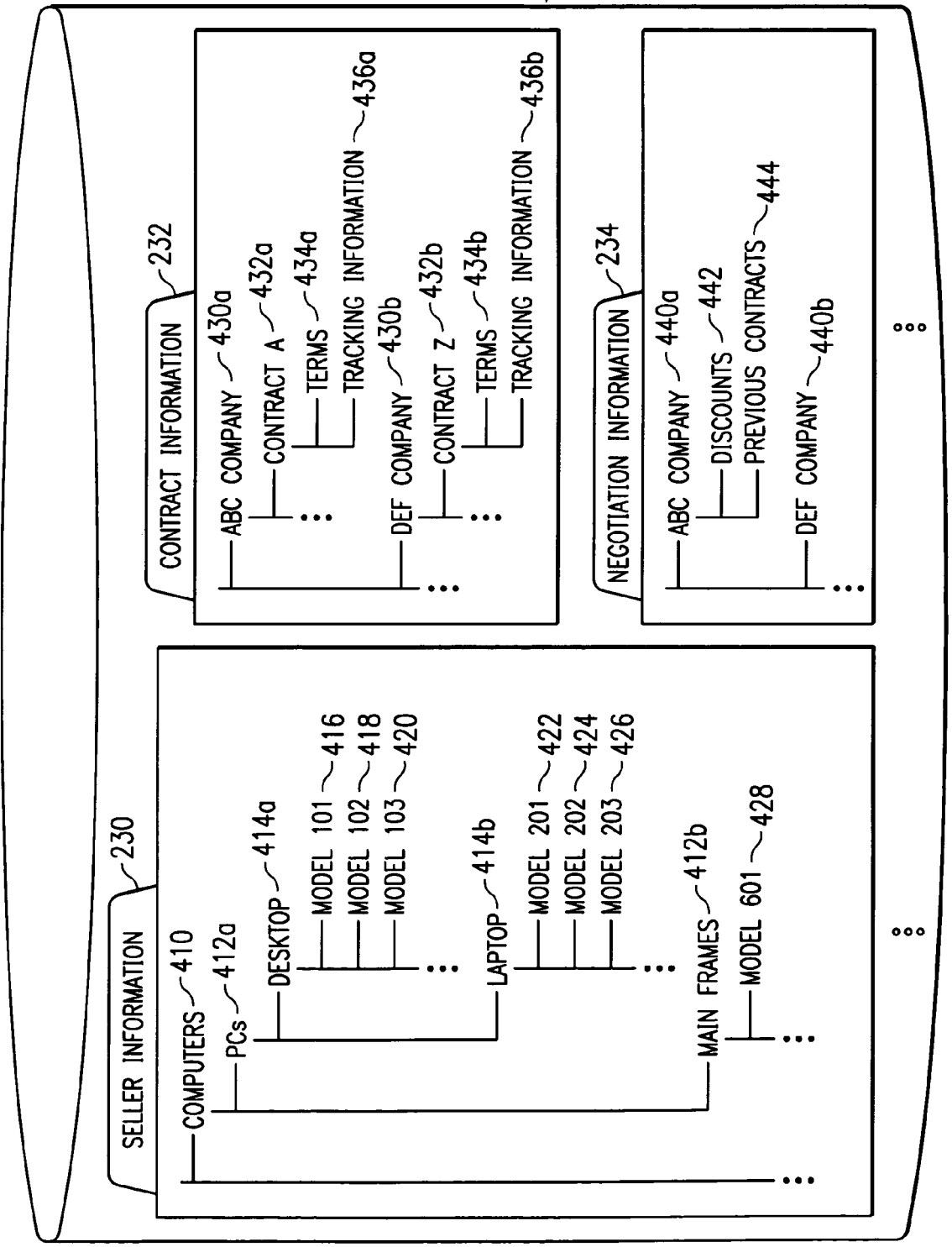

FIGS. 3a and 3b illustrate an exemplary portion of memory 32 accessible to buyer computer 20 and an exemplary portion of memory 52 accessible to seller computer 40, respectively. In the illustrated embodiment, buyer information file 130 includes product information 310, which includes a compilation of various information related to the products that the buyer using buyer computer 20 uses. In this example, product information 310 is arranged by product type 312; each product type 312 is further arranged by vendor 314, and then by product model 316 through 322.

Seller information file 230 of memory 52 also includes product information 410, which is similar to product information 310 stored in memory 32. However, product information 410 stored in memory 52 may include a slightly different aggregation than product information 310 stored in memory 32. To ensure that buyer computer 20 and seller computer 40 are able to negotiate consistent contractual terms, it may be desirable to use aggregation modules 116 and 216 to determine a common aggregation of parameters. In this case, buyer computer 20 arranges its product information 310 by product type, vendor, and model number; seller computer 40 arranges its product information 410 by product type, product sub-type 412, product application 414, and model 416 through 428. To provide a consistent aggregation, aggregation module 116 of buyer computer 20 may temporarily reaggregate buyer product information 310 to be consistent with seller product information 410, or aggregation module 216 of seller computer 40 may temporarily reaggregate seller product information 410 to be consistent with buyer product information 310. For example, aggregation module 116 may disaggregate the buyer product information 310 down to its most granular level (in this case, model numbers 316 through 322) and then build an aggregation to match that of seller product information 410.

As a particular example, buyer computer 20 may suggest a contract option comprising an offer to purchase a quantity of "desktop computers." The aggregation of "desktop computers" would commit the buyer to purchase some number of the seller's desktop computers, but give the buyer flexibility in selecting which particular model or models to purchase until a later date. Aggregation modules 116 and 216, therefore, facilitate specification of ranges of obligations that each party is willing to undertake. The parameters expressed as a range of possible values may ultimately be incorporated into a flexible trade contract in the form of an option.

An option ultimately incorporated into a flexible trade contract may specify a range of values which represents an obligation on the buyer to purchase an item and/or an obligation on the seller to supply the item. Although the previous example suggested an option as to the particular product models selected, similar options could be created that specify, for example, a range of quantities for a particular item or items desired, a range of geographical regions to be served, and/or various other attributes associated with the buyer's supply needs. Resulting contracts could have one or several dimensions of options. For example, a resulting flexible trade contract could specify a location (region), but may create an option as to the exact item to be delivered and the exact quantity demanded. Any combination of option as to region, item type, quantity, or other appropriate parameter could be implemented without departing from the scope of the present invention.

Facilitating negotiation of a flexible trade contract that includes an option provides an advantage to the buyer by allowing the buyer to defer the determination of the exact scope of its obligations until a later time, when the buyer can more accurately determine its actual supply needs. This flexibility, however, comes at a cost to the seller, who must be prepared to meet the maximum contractual obligation even if the buyer ultimately chooses a narrower contractual scope. The seller may, therefore, desire compensation for this added cost in the form of an option price.

As part of the negotiation process, buyer computer 20 and seller computer 40 may determine an option price based, for example, on the value of the option to the buyer and the cost of the option to the seller. Generally, the greater the flexibility offered to the buyer, the higher the cost to the seller, and the higher the option price. In determining the option price, option price module 118 of buyer computer 20 may determine the value of a particular option range to the buyer. Likewise, option price module 218 of seller computer 40 may determine the seller's cost of providing that option. Through an iterative process, buyer computer 20 and seller computer 40 can determine an option range associated with an option price acceptable to both the buyer and the seller.

Continuing with the negotiation process, negotiation modules 114 and 214 may access negotiation information files 134 and 234 to ascertain acceptable compromises in parameter values, such as price, quantity, locations, and/or timing. Negotiation information files 134 and 234 may, for example, include information such as price lists 342; previous discounts offered 344, 442; and other previous contractual terms 346 and 444. Negotiation modules 114 and 214 may be programmed to accept proposed contract terms provided that they fall in a given range or bear a particular relation to previously negotiated terms. In addition, negotiation modules 114 and 214 may be programmed to flag certain contractual terms as problem issues, which require user intervention and negotiation.

Once the terms of the proposed flexible trade contracts are negotiated, execution modules 119 and 219 of buyer computer 20 and seller computer 40 and/or the users of computers 20 and 40 execute a flexible trade contract created after acceptance of the proposed contracts. In the illustrated embodiment, both buyer computer 20 and seller computer 40 store the terms of the flexible trade contracts in memories 32 and 52, respectively. Referring again to FIGS. 3a and 3b, the negotiated contractual terms are stored in contract information files 132 and 232 of buyer computer 20 and seller computer 40, respectively.

In the illustrated embodiment, contract information files 132 and 232 store information relating to each contract. Among the information stored is the terms 334 and 434 of each contract, and tracking information 336 and 436. Tracking modules 120 and 220 of buyer computer 20 and seller computer 220, respectively, may access contract information files 132 and 232, respectively, to monitor and enforce the performance of the negotiated contracts. Exercise module 121 of buyer computer 20 may access contract information file 132 to exercise an option in a contract after receiving an updated forecasted demand.

FIGS. 4a through 4c illustrate exemplary terms of flexible trade contracts executed between buyer computer 20 and seller computer 40. FIG. 4a illustrates an exemplary forward contract 500. In the illustrated embodiment, forward contract 500 includes an identification of a type of contract 502, a buyer 504, a seller 506, an execution date 508 of contract 500, a delivery date 510, a product 512 to be delivered, a delivery location 514, a quantity 516 of product 512 to be delivered, a penalty 518 for failing to comply with the terms of contract 500, and a price 520 for product 512. In a particular embodiment, forward contract 500 may be a unit forward contract by reciting in quantity field 516 that buyer 504 agrees to purchase and seller 506 agrees to supply one unit of the product 512.

FIG. 4b illustrates an exemplary option contract 530. In the illustrated embodiment, option contract 530 includes an identification of a type of contract 532, a buyer 534, a seller 536, an execution date 538 of contract 530, a delivery date 540, a product 542 to be delivered, and a delivery location 544. In addition, option contract 530 may include a maximum quantity 546 of product 542. Buyer 534 is not obligated to purchase any amount of product 542, but buyer 534 may purchase up to the maximum quantity 546 of product 542. Seller 536 is obligated to supply up to the maximum quantity 546 of product 542. Option contract 530 also includes a range of exercise dates 548 specifying the earliest possible date 550 that buyer 534 can exercise its option under contract 530, and the latest possible date 552 by which buyer 534 must exercise its option under contract 530. Depending on the contract terms, buyer 534 may place a single order with seller 536, or buyer 534 may incrementally place several individual orders for product 542 over the course of the exercise period 548. Option contract 530 further includes a penalty 554 for failing to comply with the terms of contract 530, a price 556 for product 542, and a price 558 representing the value of the option.

In the illustrated embodiment, the option relates to a quantity 546 of a product 542, but the option could also relate to any level of obligation between the parties. For example, the option could also relate to a product type and/or a delivery location. As described above, the option could similarly relate to a service or other tangible or intangible item. Also, in a particular embodiment, option contract 530 may be a unit option contract by reciting in quantity field 546 that seller 536 agrees to supply a maximum of one unit of product 542.

In processing contract 530, seller computer 40 accepts orders of buyer computer 20 after the beginning exercise date 550. Seller computer 40 receives purchase orders as long as the cumulative amount of product 542 ordered does not exceed the maximum quantity 546 specified in contract 530 and until the exercise end date 552. Seller computer 40 could, of course, be programmed to accept purchase orders specifying a quantity greater than maximum quantity 546 or orders received before the beginning exercise date 550 or after the exercise end date 552. Under the terms of contract 530, however, seller computer 40 is not required to accept such orders.

Seller computer 40 stores a record of each purchase order received and, after expiration of the exercise period 548, facilitates delivery of a cumulative total order. If the seller 536 fails to deliver a valid quantity of product 542, or delivers product 542 too late or to the wrong destination, buyer computer 20 may impose penalty 554 for the seller's violation.

FIG. 4c illustrates an exemplary flexible forward contract 560. In the illustrated embodiment, flexible forward contract 560 includes an identification of a type of contract 562, an execution date 564 of contract 560, an exercise period 566 that identifies a starting time 568 and an ending time 570 during which a buyer must exercise one or more options in contract 560, a total quantity 572 of one or more products that the buyer agrees to purchase and the seller agrees to supply, and an option price 574 representing the value of the options. Contract 560 also includes a plurality of subcontracts 576, where each subcontract 576 includes an option.

In the illustrated embodiment, each subcontract 576 includes an identification of a buyer 578, a seller 580, a delivery date 582, a product 584, a delivery location 586, a quantity range 588, a penalty 590 for failing to comply with the terms of contract 560, and a price 592 for the product 584. Quantity range 588 defines a maximum quantity 594 of product 584 that seller 580 agrees to supply and a minimum quantity 596 that buyer 578 agrees to purchase.

In a particular embodiment, flexible forward contract 560 may be a unit flexible forward contract. In this embodiment, contract 560 recites in total quantity field 572 that buyer 578 agrees to purchase and seller 580 agrees to supply one unit of a product. Also, each subcontract 576 recites one unit in maximum quantity field 594 and zero units in minimum quantity field 596.

In the illustrated embodiment, subcontracts 576 are shown as including options involving the quantities of two products 584a and 584b, but the options could relate to any level of obligation between the parties. For example, the options could relate to quantities of two different product types, or quantities that will be delivered to two different locations. As described above, the option could similarly relate to a service or other tangible or intangible item. Also, while buyer 578 and seller 580 are the same in both subcontracts 576, a buyer 578 in one subcontract 576 may be a seller 580 in another subcontract 576.

In processing contract 560, seller computer 40 accepts orders of buyer computer 20 after the beginning exercise date 568. Seller computer 40 receives purchase orders for one or more products as long as the cumulative amount of products ordered does not exceed the total quantity 572 or the maximum quantity 594 for that product 584, and until the exercise end date 570. Seller computer 40 could, of course, be programmed to accept purchase orders specifying a quantity greater than total quantity 572 or maximum quantity 594, or orders received before the beginning exercise date 568 or after the exercise end date 570. Under the terms of contract 560, however, seller computer 40 is not required to accept such orders.

Seller computer 40 stores a record of each purchase order received and, after expiration of the exercise period 566, facilitates delivery of a cumulative total order. If the seller 580 fails to deliver a valid quantity of each product 584, or delivers product 584 too late or to the wrong destination, buyer computer 20 may impose penalty 590 for the violation. Likewise, if the buyer 578 fails to order a total quantity 572 of products 584 or the minimum quantity 596 of each product 584, seller computer 40 may impose penalty 590 on buyer 578.

System 10 provides significant advantages in optimizing supply chain activities in a multi-enterprise trading environment. Through a variety of mechanisms, system 10 increases the profitability of both parties to the contracts. By using one or more flexible trade contracts, system 10 reduces the uncertainty in each party's forecasts. The ability to provide one or more dimensions of flexibility to the buyer (e.g., options as to quantity, product, geography, etc.) when it is needed gives value to the buyer. The buyer is able to later select optimum exercise values for the option parameters, reducing supply/demand mismatches. System 10 also provides a mechanism to ensure a win-win situation for both parties by setting an option price to account for the value to the buyer and the corresponding cost to the seller. In addition, providing well-defined penalties for violation of the terms of the resulting contracts provides an incentive for each party to provide the most accurate forecasts possible.

Figure 5A:
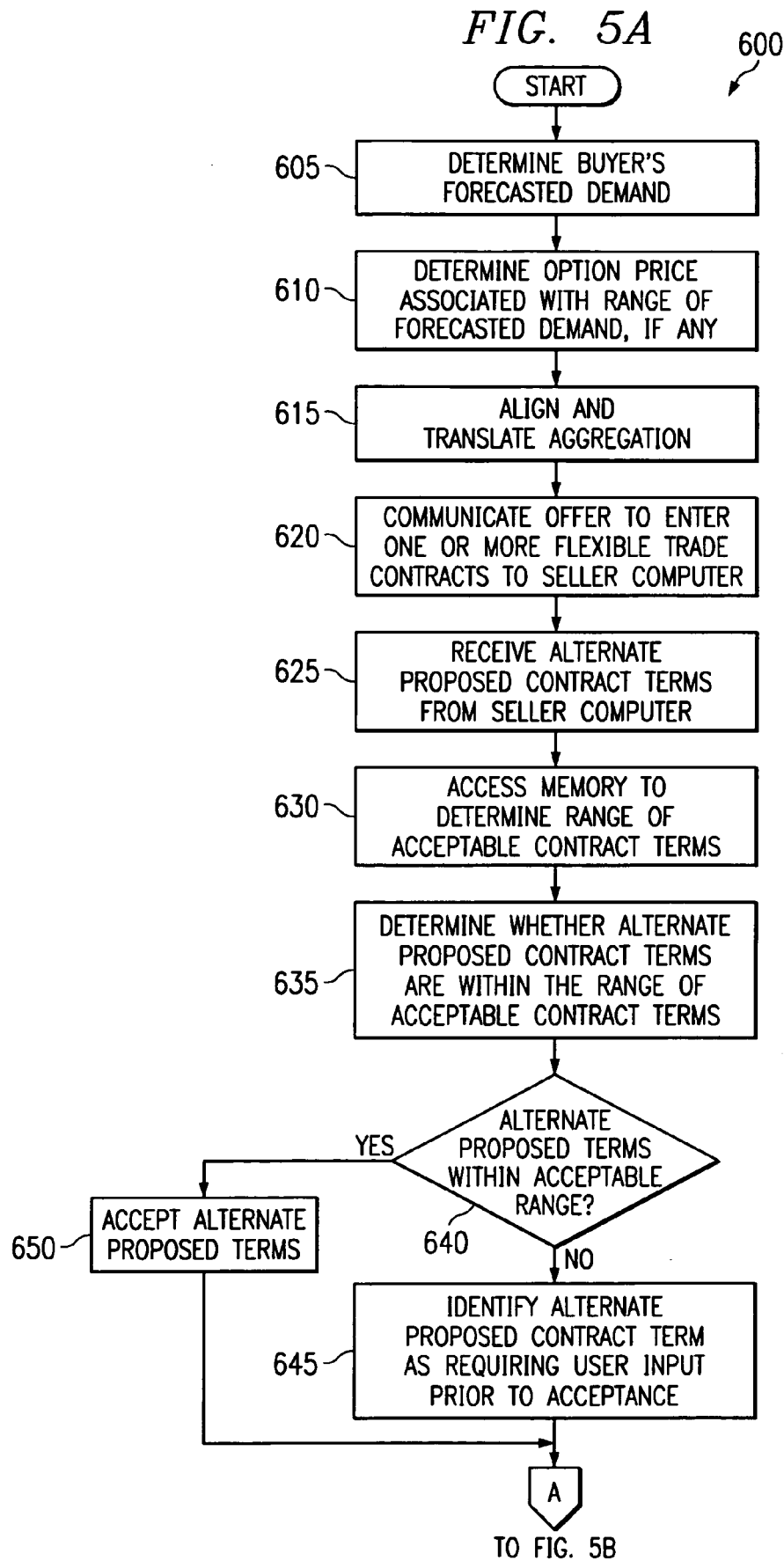
FIG. 5 illustrates an exemplary method of multi-enterprise optimization using flexible trade contracts.
Figure 5B:
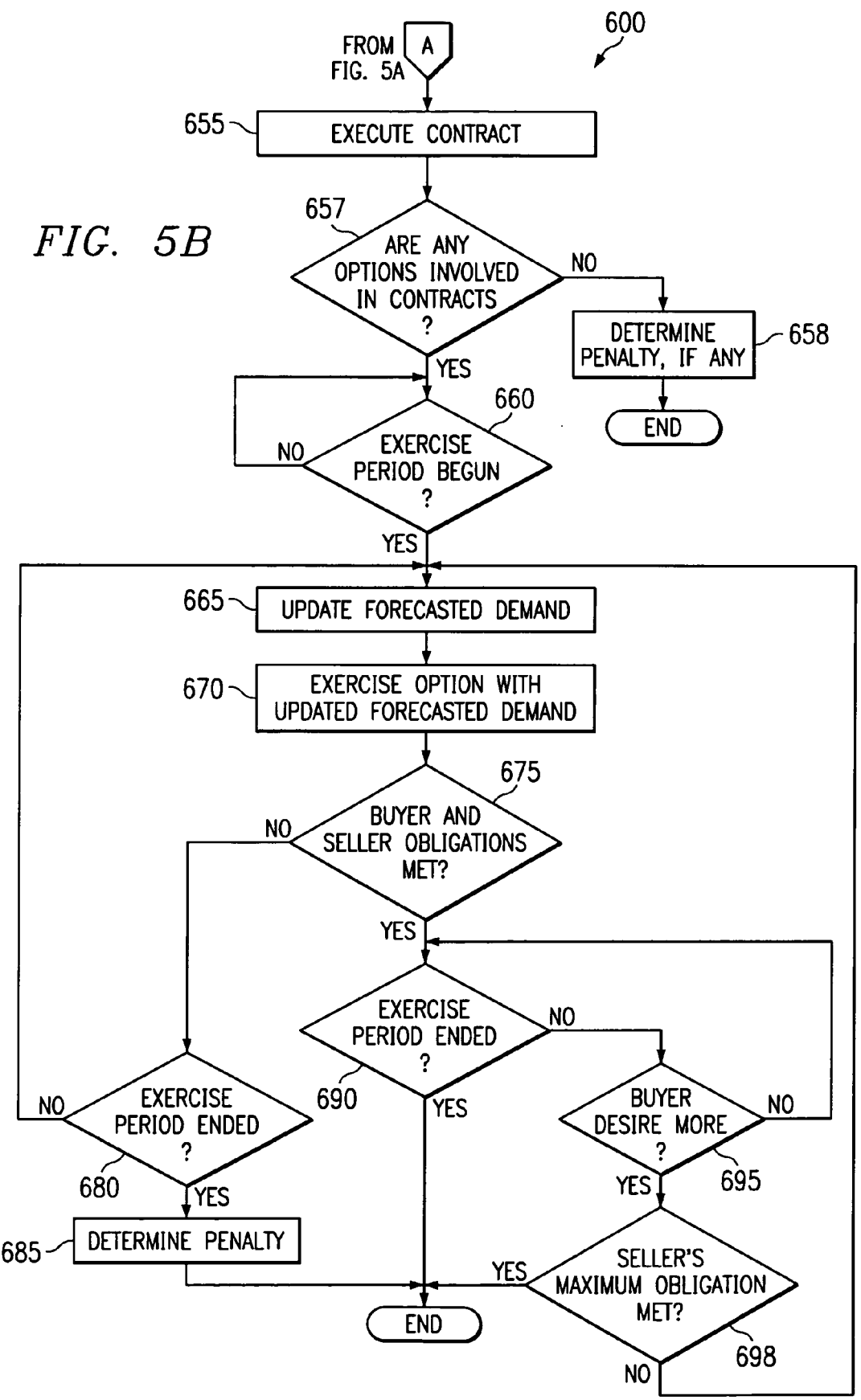

FIG. 5 illustrates an exemplary method 600 of multi-enterprise optimization using flexible trade contracts. Buyer computer 20 determines a buyer's forecasted demand for at least one item at a step 605. For example, forecast module 112 of buyer computer 20 may initially approximate the buyer's demand by applying current and/or historical data to various demand forecasting and optimization models to yield a forecasted demand. The forecasted demand generated by forecast module 112 may be a fixed forecasted demand. The forecasted demand may also include a range of forecasted demand generated, for example, using statistical models identifying historical or estimated errors in the forecasted demand. When buyer computer 20 determines a range of forecasted demand at step 605, buyer computer 20 may also determine an option price associated with the range of forecasted demand at a step 610. For example, option price module 118 may determine the value of the flexibility gained by the range of forecasted demand (as opposed to a fixed forecasted demand) and assign an option price corresponding to that value.

Buyer computer 20 may contact seller computer 40 and perform aggregate alignment and translation at a step 615. For example, aggregation modules 116 and 216 may establish a common aggregation of contract terms before computers 20 and 40 begin negotiations. Buyer computer 20 communicates an offer to enter into one or more proposed flexible trade contracts to seller computer 40 at a step 620. This may include, for example, communicating the offer directly to seller computer 40 or indirectly through an intermediary such as, for example, a business-to-business exchange or an on-line marketplace. The offer to enter into one or more flexible trade contracts may include an option corresponding to a range of forecasted demand identified by buyer computer 20 (if any), and may also include a proposed option price.

Buyer computer 20 may receive alternate proposed contract terms from seller computer 40 at a step 625. Negotiation module 114 may analyze the alternate proposed contract terms by accessing memory 32 to determine a range of acceptable contract terms at a step 630. Negotiation module 114 determines whether the alternate proposed contract terms are within a range of acceptable contract terms retrieved from memory 32 at a step 635. If negotiation module 114 determines that the alternate proposed terms are within the acceptable range retrieved from memory 32 at a step 640, negotiation module 114 may accept the alternate proposed terms without user input at a step 650. In the event that negotiation module 114 determines at step 640 that the alternate proposed terms are not within the acceptable range retrieved from memory 32, negotiation module 114 may identify the alternate proposed contract term or terms as requiring user input prior to acceptance at a step 645. A user of buyer computer 20 may intervene to negotiate the non-accepted proposed term. Execution module 119 may execute one or more flexible trade contracts after acceptance of the proposed contracts at a step 655. In addition, execution module 119 may store the terms of the executed contract in contract information file 132 of memory 32.

If buyer computer 20 determines that the executed flexible trade contracts do not contain an option at a step 657, tracking module 120 may determine if the seller complied with the contract terms and, if necessary, calculate a penalty at a step 658. However, when one or more of the executed flexible trade contracts contain an option, tracking module 120 determines whether the exercise period has begun at a step 660. Anytime after the exercise period has begun, tracking module 120 may initiate, or act in response to a user input requesting, an update of the buyer's forecasted demand. A user of buyer computer 20 or forecasting module 112 updates the buyer's forecasted demand to determine the buyer's current demand needs at a step 665. Exercise module 121 communicates a request to seller computer 40 to exercise the option in the flexible trade contract according to the updated forecasted demand at a step 670. Tracking module 120 stores the value of the updated forecasted demand in contract information file 132 of memory 32.

Tracking module 120 next determines whether the exercise of the option satisfies obligations of the buyer and seller at a step 675. This may include, for example, determining whether the exercise fails to meet the total quantity required or falls below the buyer's minimum obligation under a flexible forward contract. If obligations of the buyer and/or the seller have not been met, tracking module 120 determines whether the exercise period has ended at a step 680. If the exercise period has ended, tracking module 120 determines a penalty for the failure of the buyer and/or the seller to comply with the terms of the contract at a step 685. If, however, tracking module 120 determines at step 680 that time remains in the exercise period, tracking module 120 awaits another update to the buyer's forecasted demand at step 665.

Even where the minimum obligations of the buyer and seller have been met at step 675, the terms of the flexible trade contract may allow buyer computer 20 to place further purchase orders prior to the expiration of the exercise period. For example, procurement manager 34 may determine that the exercise period has not ended at a step 690. If buyer computer 20 received an indication, either through user input or through information stored in memory 32, that the buyer desires more of an item at a step 695, procurement manager 34 may communicate another updated forecasted demand at step 665 requesting additional product. In a particular embodiment, procurement manager 34 may be programmed to refuse to communicate another updated forecasted demand if it determines at a step 698 that the seller's maximum obligation has been met. For example, the contract may specify a maximum quantity for the seller's obligation. If buyer computer 20 has already requested the maximum quantity, procurement manager 34 can be programmed to disallow further requests to seller computer 40.

Figure 6B:
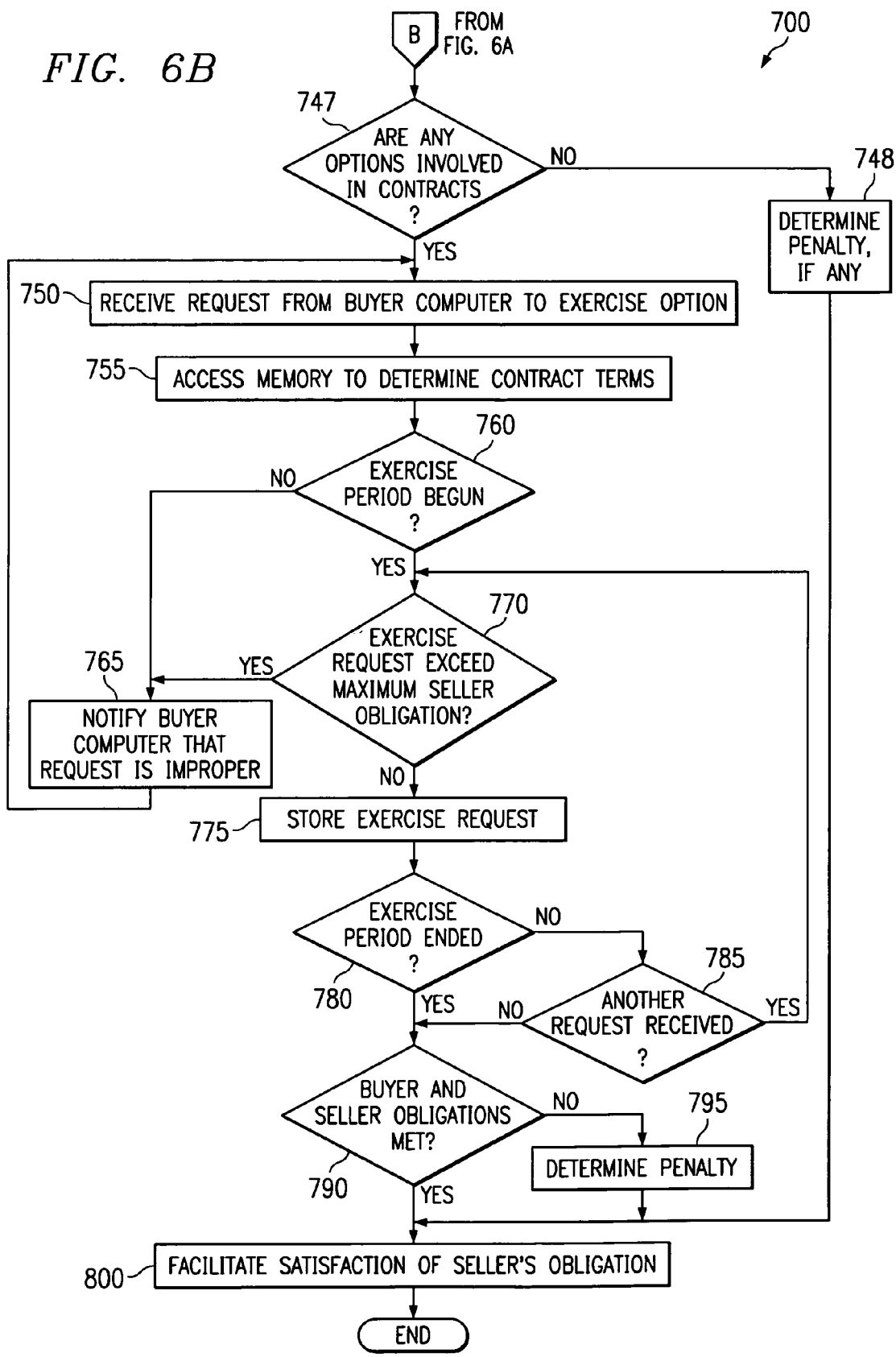
FIG. 6 illustrates another exemplary method of multi-enterprise optimization using flexible trade contracts.

FIG. 6 illustrates another exemplary method 700 of multi-enterprise optimization using flexible trade contracts. Supply manager 54 of seller computer 40 receives proposed terms of one or more flexible trade contracts from buyer computer 20 at a step 705. This may include, for example, receiving the proposed terms directly from buyer computer 20 or indirectly through an intermediary such as, for example, a business-to-business exchange or an on-line marketplace. Aggregation module 216 may align and translate the aggregation of parameters in the flexible trade contracts at a step 710.

Forecast module 212 determines a seller's forecasted supply capacity at a step 715. The forecasted supply capacity may include a fixed supply capacity or a range of supply capacities. Forecast module 212 may also determine an option price associated with any range of forecasted supply capacities at a step 720. Based on these calculations, negotiation module 214 of supply manager 54 may determine whether the contract terms proposed by buyer computer 20 are acceptable at a step 725. In addition, or in the alternative, negotiation module 214 may consult negotiation information file 234 to determine whether the proposed contract terms are acceptable. If the proposed contract terms are found to be acceptable at step 725, execution module 219 executes the flexible trade contract at a step 740. If, however, negotiation module 214 determines at step 725 that the proposed contract terms are not acceptable, negotiation module 214 may communicate alternate proposed contract terms to buyer computer 20 at a step 730 and negotiate the ultimate terms of the contract at a step 735. This may include, for example, comparing proposed contract terms to a range of acceptable terms stored in negotiation file 234, and identifying particular terms as requiring user input prior to acceptance.

Execution module 219 stores the terms of the executed contract or contracts in memory 52 at a step 745. If seller computer 40 determines that the flexible trade contracts do not include an option at a step 747, tracking module 220 may determine if the buyer complied with the contract terms and, if necessary, calculate a penalty at a step 748. If at least one of the flexible trade contracts includes an option, seller computer 40 may receive a request from buyer computer 20 to exercise the option in the contract at a step 750. Supply manager 54 accesses memory 52 to determine the terms of the contract at a step 755, and supply manager 54 determines whether the exercise period has begun at a step 760. If supply manager 54 determines that the exercise period has not begun at step 760, supply manager 54 notifies buyer computer 20 that its request is improper at a step 765. Of course, supply manager 54 can be programmed to accept premature purchase orders.

If supply manager 54 determines at step 760 that the exercise period has begun, it determines whether the request exceeds the maximum seller obligation at a step 770. This may include, for example, comparing the buyer's request against the seller's maximum obligation under an option in the contract and/or against the total quantity field in a flexible forward contract. If supply manager 54 determines at step 770 that the exercise request from buyer computer 20 exceeds the maximum seller obligation, supply manager 54 notifies buyer computer 20 that its request is improper at step 765. Of course, supply manager 54 could be programmed to accept exercise requests that exceed the maximum seller obligation such as, for example, those exceeding the maximum seller obligation by a predetermined amount.

If supply manager 54 determines at step 770 that the exercise request received from buyer computer 20 does not exceed the maximum seller obligation, it stores the exercise request in contract information file 232 of memory 52 at a step 775. Supply manager 54 determines whether the exercise period has ended at a step 780. For example, supply manager 54 may compare a current date (obtained, for example, from the system clock of seller computer 40) with the exercise period end date in the contract. If supply manager 54 determines at step 780 that the exercise period has not ended, it may receive another exercise request from buyer computer 20 at a step 785 and process that request as described above.

If supply manager 54 determines at step 780 that the exercise period has ended, it determines whether the buyer and seller have met all of their contractual obligations at a step 790. This may include, for example, determining whether the buyer's exercise fails to meet the total quantity required or falls below the buyer's minimum obligation under a flexible forward contract. If supply manager 54 determines at step 790 that obligations of the buyer and/or the seller have not been met, it determines a penalty at a step 795. This may include, for example, tracking module 220 accessing contract information file 232 to identify the contract provision and calculating a resulting penalty.

Supply manager 54 facilitates satisfaction of the seller's obligation at a step 800. For example, supply manager 54 can be programmed to automatically schedule delivery of the product under the terms of the contract. Supply manager 54 can also be programmed to accommodate delivery of non-conforming quantity requests.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of supply chain activity optimization involving multiple enterprises at a buyer computer system, comprising:

accessing a forecasted demand for at least one item;

automatically and without user input subsequent to accessing the forecasted demand, generating one or more proposed flexible trade contracts using the forecasted demand for the item;

automatically and without user input subsequent to generating the proposed flexible trade contracts, communicating each proposed flexible trade contract to a seller computer system to initiate an automatic collaborative negotiation over the proposed flexible trade contract with the seller computer system;

automatically and without user input subsequent to communicating the proposed flexible trade contract, as part of the automatic collaborative negotiation, receiving at least one modification of the proposed flexible trade contract from the seller computer system for automatic evaluation and possible acceptance in response to communicating the proposed flexible trade contract;

automatically and without user input subsequent to receiving the modification of the proposed flexible trade contract from the seller computer system, as part of the automatic collaborative negotiation, evaluating the modification to determine whether the modification is acceptable;

automatically and without user input subsequent to evaluating the modification of the proposed flexible trade contract, as part of the automatic collaborative negotiation, accepting the modification if the modification is acceptable;

subsequent to execution of a flexible trade contract created based on the proposed flexible trade contract as a result of the automatic collaborative negotiation, taking one or more actions to perform under the executed flexible trade contract; and subsequent to execution of the flexible trade contract created based on the proposed flexible trade contract as a result of the automatic collaborative negotiation, taking one or more actions to enforce the executed flexible trade contract.

2. The method of claim 1, wherein each proposed flexible trade contract is selected from the group consisting of a forward contract, an option contract, and a flexible forward contract.

3. The method of claim 2, wherein each forward contract comprises a quantity of the item that a buyer is obligated to purchase and a seller is obligated to supply.

4. The method of claim 3, wherein each forward contract comprises a unit forward contract, and wherein the buyer is obligated to purchase and the seller is obligated to supply a quantity of one unit of the item.

5. The method of claim 2, wherein each option contract comprises an option, the option comprising at least one parameter selected from the group consisting of:
a maximum quantity of the item that a seller is obligated to supply;
a maximum number of item types that the seller is obligated to supply; and
a maximum number of locations where the item must be provided.

6. The method of claim 5, wherein each option contract comprises a unit option contract, and wherein the parameter is selected from the group consisting of:
a maximum of one unit of the item;
a maximum of one item type; and
a maximum of one location.

7. The method of claim 5, wherein each option contract comprises an exercise period after the execution of the option contract during which a buyer must exercise the option.

8. The method of claim 2, wherein each flexible forward contract comprises:
a total quantity of one or more items that a buyer is obligated to purchase and a seller is obligated to supply; and
a plurality of subcontracts each comprising an option, each option comprising at least one parameter selected from the group consisting of:
a range of quantities for one item;
a range of quantities for one item type; and
a range of quantities for one location where the item must be provided.

9. The method of claim 8, wherein each flexible forward contract comprises a unit flexible forward contract, and wherein the total quantity is one unit and the parameter is selected from the group consisting of:
a range of zero to one unit for the item;
a range of zero to one unit for the item type; and
a range of zero to one unit for the location.

10. The method of claim 8, wherein each flexible forward contract comprises an exercise period after the execution of the flexible forward contract during which the buyer must exercise the option.

11. The method of claim 1, comprising:
receiving an alternate contract term from the seller computer system for automatic evaluation and possible acceptance;
automatically and without user input subsequent to receiving the alternate contract term from the seller computer system, accepting the alternate contract term without user input if the alternate contract term falls within a range of acceptable contract terms; and
automatically and without user input subsequent to receiving the alternate contract term from the seller computer system, identifying the alternate contract term as requiring user input if the alternate contract term falls outside the range of acceptable contract terms.

12. The method of claim 1, further comprising:
updating the forecasted demand for the item; and
automatically and without user input subsequent to updating the forecasted demand for the item, exercising an option in the flexible trade contract based on the updated forecasted demand.

13. The method of claim 1, further comprising, automatically and without user input subsequent to execution of the flexible trade contract, calculating a penalty if a seller fails to comply with a term of the flexible trade contract.

14. The method of claim 1, wherein communicating each proposed flexible trade contract to the seller computer system comprises communicating each proposed flexible trade contract to the seller computer system through an intermediary.

15. A method of supply chain activity optimization involving multiple enterprises at a seller computer system, comprising:
receiving, as part of an automatic collaborative negotiation, one or more proposed flexible trade contracts from a buyer computer system for automatic evaluation and possible acceptance, each proposed flexible trade contract reflecting a buyer's forecasted demand for at least one item;
automatically and without user input subsequent to receiving a proposed flexible trade contract from the buyer computer system, as part of the automatic collaborative negotiation, evaluating the proposed flexible trade contract to determine whether the proposed flexible trade contract is acceptable;
automatically and without user input subsequent to evaluating the proposed flexible trade contract, as part of the automatic collaborative negotiation:
if the proposed flexible trade contract is acceptable, accepting the proposed flexible trade contract; and
if the proposed flexible trade contract is not acceptable, generating at least one modification of the proposed flexible trade contract and communicating the modification to the buyer computer system for automatic evaluation and possible acceptance;
subsequent to execution of a flexible trade contract created based on the proposed flexible trade contract as a result of the automatic collaborative negotiation, taking one or more actions to perform under the executed flexible trade contract; and
subsequent to execution of the flexible trade contract created based on the proposed flexible trade contract as a result of the automatic collaborative negotiation, taking one or more actions to enforce the executed flexible trade contract.

16. The method of claim 15, wherein each proposed flexible trade contract is selected from the group consisting of a forward contract, an option contract, and a flexible forward contract.

17. The method of claim 16, wherein each forward contract comprises a quantity of the item that the buyer is obligated to purchase and a seller is obligated to supply.

18. The method of claim 17, wherein each forward contract comprises a unit forward contract, and wherein the buyer is obligated to purchase and the seller is obligated to supply a quantity of one unit of the item.

19. The method of claim 16, wherein each option contract comprises an option, the option comprising at least one parameter selected from the group consisting of:
  a maximum quantity of the item that a seller is obligated to supply;
  a maximum number of item types that the seller is obligated to supply; and
  a maximum number of locations where the item must be provided.

20. The method of claim 19, wherein each option contract comprises a unit option contract, and wherein the parameter is selected from the group consisting of:
  a maximum of one unit of the item;
  a maximum of one item type; and
  a maximum of one location.

21. The method of claim 19, wherein each option contract comprises an exercise period after the execution of the option contract during which the buyer must exercise the option.

22. The method of claim 16, wherein each flexible forward contract comprises:
  a total quantity of one or more items that the buyer is obligated to purchase and a seller is obligated to supply; and
  a plurality of subcontracts each comprising an option, each option comprising at least one parameter selected from the group consisting of:
  a range of quantities for one item;
  a range of quantities for one item type; and
  a range of quantities for one location where the item must be provided.

23. The method of claim 22, wherein each flexible forward contract comprises a unit flexible forward contract, and wherein the total quantity is one unit and the parameter is selected from the group consisting of:
  a range of zero to one unit for the item;
  a range of zero to one unit for the item type; and
  a range of zero to one unit for the location.

24. The method of claim 22, wherein each flexible forward contract comprises an exercise period after the execution of the flexible forward contract during which the buyer must exercise the option.

25. The method of claim 15, comprising:
  automatically and without user input subsequent to evaluating the proposed flexible trade contract, generating an alternate contract term; and
  automatically and without user input subsequent to generating the alternate contract term, communicating the alternate contract term to the buyer computer system for automatic evaluation and possible acceptance.

26. The method of claim 15, further comprising:
  receiving a request from the buyer computer system to exercise an option in the flexible trade contract; and
  automatically and without user input subsequent to receiving the request from the buyer computer system, accepting the buyer's request if the buyer computer system submitted the request within an exercise period and the request does not exceed a term of the flexible trade contract.

27. The method of claim 15, further comprising, automatically and without user input subsequent to execution of the flexible trade contract, calculating a penalty if the buyer fails to comply with a term of the flexible trade contract.

28. The method of claim 15, wherein receiving one or more proposed flexible trade contracts from the buyer computer system comprises receiving one or more proposed flexible trade contracts from the buyer computer system through an intermediary.

29. The method of claim 1, further comprising, as part of the collaborative negotiation, communicating with the seller computer system in a series of rounds in which the buyer computer system and the seller computer system successively propose one or more counter-modifications of the proposed flexible trade contract for automatic evaluation and possible acceptance to create the flexible trade contract.

30. The method of claim 15, further comprising, as part of the collaborative negotiation, communicating with the buyer computer system in a series of rounds in which the buyer computer system and the seller computer system successively propose one or more counter-modifications of the proposed flexible trade contract for automatic evaluation and possible acceptance to create the flexible trade contract.

* * * * *